ic Patent [19]

Panchison, Jr.

[11] Patent Number: 4,842,244
[45] Date of Patent: Jun. 27, 1989

[54] VALVE CONTROL SYSTEM FOR POWER GENERATING PLANTS

[75] Inventor: Joseph J. Panchison, Jr., Fallsington, Pa.

[73] Assignee: Niagara Mohawk Power Corporation, Syracuse, N.Y.

[21] Appl. No.: 118,938

[22] Filed: Nov. 10, 1987

[51] Int. Cl.[4] .................. F16K 31/124; F16K 5/06
[52] U.S. Cl. .................. 251/26; 251/30.01; 251/62; 60/431; 91/454
[58] Field of Search .......... 251/26, 27, 62, 30.01, 251/25; 60/431; 91/454

[56] References Cited

U.S. PATENT DOCUMENTS 4,500,066  2/1985  Trassl .................... 251/26
4,553,731  11/1985  Carpenter ............... 251/27

FOREIGN PATENT DOCUMENTS 917648  2/1963  United Kingdom ............ 251/30.01

Primary Examiner—Arnold Rosenthal
Attorney, Agent, or Firm—Lalos & Keegan

[57] ABSTRACT

In a steam generating plant having a main steam line and a pivotally actuated valve movable between open and closed positions for controlling the flow of steam in the main steam line, a system for operating the main steam line valve comprising a spring assembly for biasing the valve pivotally into the closed position, fluid actuated means for urging the valve pivotally into the open position against the biasing action of the spring assembly and means for supplying fluid under pressure for the fluid actuated means, the fluid supply means including a pump operatively connected to the fluid actuated means and at least one exhaust valve operatively connected to the pressure end of the pump.

22 Claims, 4 Drawing Sheets

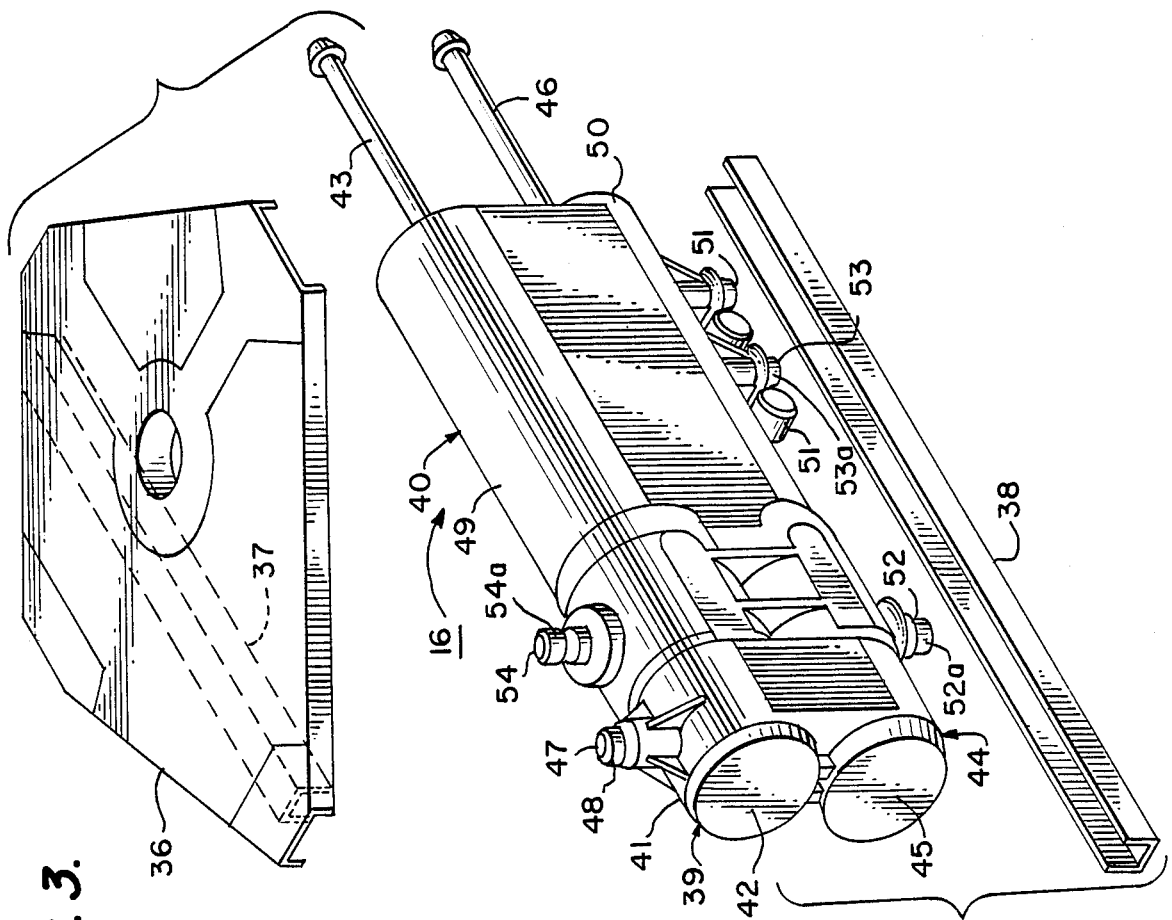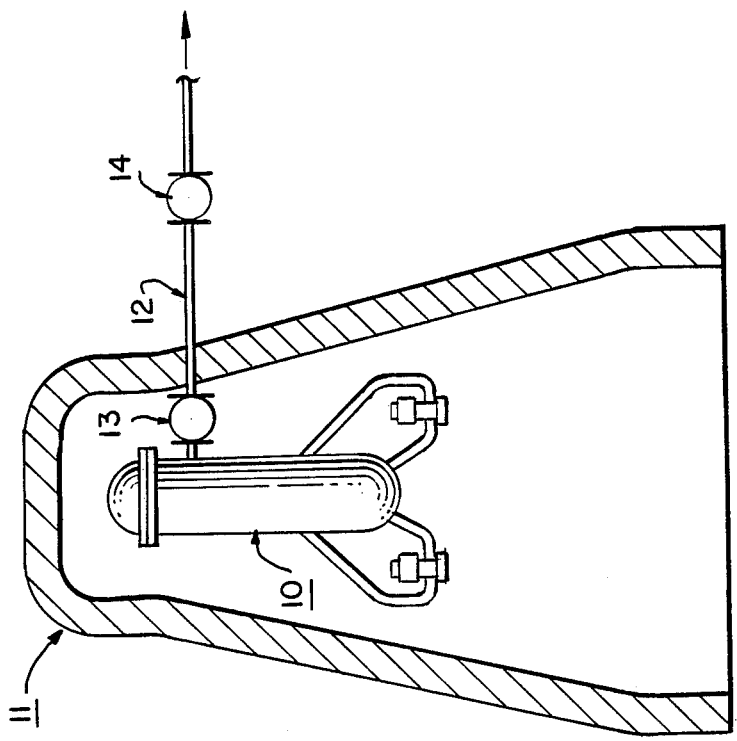

VALVE CONTROL SYSTEM FOR POWER GENERATING PLANTS

This invention relates to a control system and more particularly to a system for controlling an isolation valve in a main steam line of a power generating plant.

In nuclear power generating plants, the reactor vessel usually is housed in a containment structure for the purpose of preventing the release of radioactivity to the environment in the event of a malfunctioning of the vessel. High pressure steam generated by the vessel under normal operating conditions is conveyed from the vessel to high pressure turbines through a main steam line passing through the containment structure. Typically, such main steam lines are provided with isolation valves disposed in series on the inner and outer sides of the containment structure which are operable during normal operating procedures and under emergency conditions to shut off the flow of high pressure steam in such lines. Depending on the operating conditions, such valves are required to close at different rates. Under normal operating conditions, such as when a reactor vessel or turbine is taken out of service for inspection, maintenance or repir purposes, such valves are required to be closed at a slow rate. However, under emergency conditions, such as when there is a break in the main steam line, there is a loss of coolant accident in the reactor vessel or on the occasion of a similar event, it is required that such valves be operated to close at a rapid rate, i.e., in the order of three to five seconds to prevent an uncontrolled release of radioactivity from the reactor vessel to the environment. In addition, it is required that such valves and their control components be environmentally and seismically qualified with respect to regulatory specifications, and reliable in performance during the service life of the system.

In the prior art, it has been found that conventional main steam isolation valves and their related control systems have not been entirely satisfactory in performance. In particular, they have been found to be deficient in being capable of closing sufficiently rapidly under emergency conditions, and in being capable of rapidly closing reliably and consistently over the service life of the system.

The present invention provides a control system for a main steam isolation valve suitable for use in a nuclear power generating plant which utilizes a biasing means for providing a constant force to urge the valve into a closed position, and an electrically operated, fluid actuated means for providing a selectively applied counteracting force, against the constantly applied force of the biasing means, to urge the valve into an open condition. Through the operation of electrical controls, the counteracting force may be removed gradually to allow the biasing force to be applied gradually and correspondingly close the valve at a slow rate as would be required under normal operating procedures, or, the counteracting force may be removed rapidly to allow the biasing force to be applied rapidly to correspondingly close the valve rapidly during emergency conditions.

Accordingly, it is principal object of the present invention to provide a novel control system for a valve.

Another object of the present invention is to provide a novel control system for a valve used in a high pressure steam line.

A further object of the present invention is to provide a novel valve control system for a main steam line of a power generating plant.

A still further object of the present invention is to provide a novel valve control system applicable to a main steam line of a nuclear power generating plant.

Another object of the present invention is to provide a valve control system for a main steam line of a nuclear power generating plant which is operable to close an isolation valve rapidly and reliably under emergency conditions to prevent the release of radioactivity into the environment.

A further object of the present invention is to provide a novel valve control system for a main steam line in a nuclear power generating plant which is operable, selectively, to close an isolation valve at a gradual rate as required during normal valve closing procedures and to close at a rapid rate as required under emergency conditions.

A still further object of the present invention is to provide a novel valve closing system for a main steam line in a nuclear power generating plant in which a constant and reliable force is provided to close the valve either gradually under normal operating procedures or rapidly under emergency conditions to isolate steam generated by the reactor vessel of the plant.

Another object of the present invention is to provide a novel valve control system for a main steam line of a nuclear power generating plant which is comparatively simple in design, relatively inexpensive to manufacture, install and maintain and highly reliable and effective in performance.

Other objects and advantages of the present invention will become more apparent to those persons having ordinary skill in the art to which the present invention pertains from the following description taken in conjunction with the accompanying drawings wherein:

FIG. 1 is an elevational, cross-sectional view of a containment structure of a nuclear power generating plant, illustrating a reactor vessel disposed within the containment structure, a main steam line extending from the reactor vessel and through the containment structure and a pair of isolation valves in the main steam line which are adapted to be operated by a control system comprising the present invention;

FIG. 3 is a perspective view of the spring assembly shown in FIG. 2 illustrating certain support structure components thereof disposed in exploded relation relative to the spring assembly;

Figure 2:
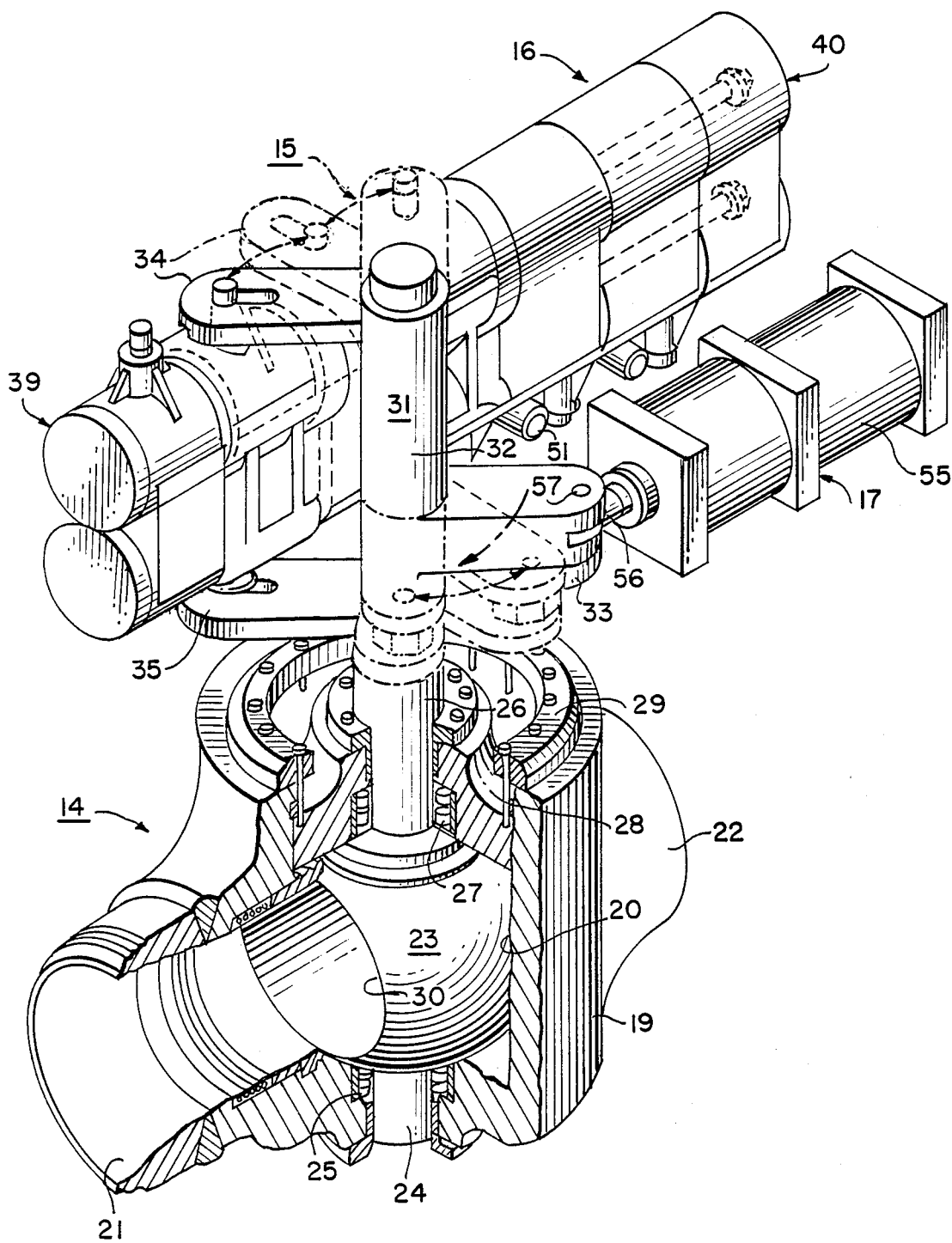
FIG. 2 is perspective view of an isolation valve shown in FIG. 1 and certain components of the control system for the valve, including a spring assembly and an actuating mechanism.

Referring to FIG. 1 of the drawings, there is illustrated diagrammatically a portion of a nuclear power generating plant consisting of a reactor vessel 10 disposed within a containment structure 11, a high pressure, main steam line 12 extending from reactor vessel 10 and through a wall portion of containment structure 12 and operatively connected to a high pressure turbine, a first isolation valve 13 mounted in the main steam line on the inner side of the containment structure and a second isolation valve 14 mounted on the main steam line in series with valve 13, on the outer side of the containment structure.

Figure 6:
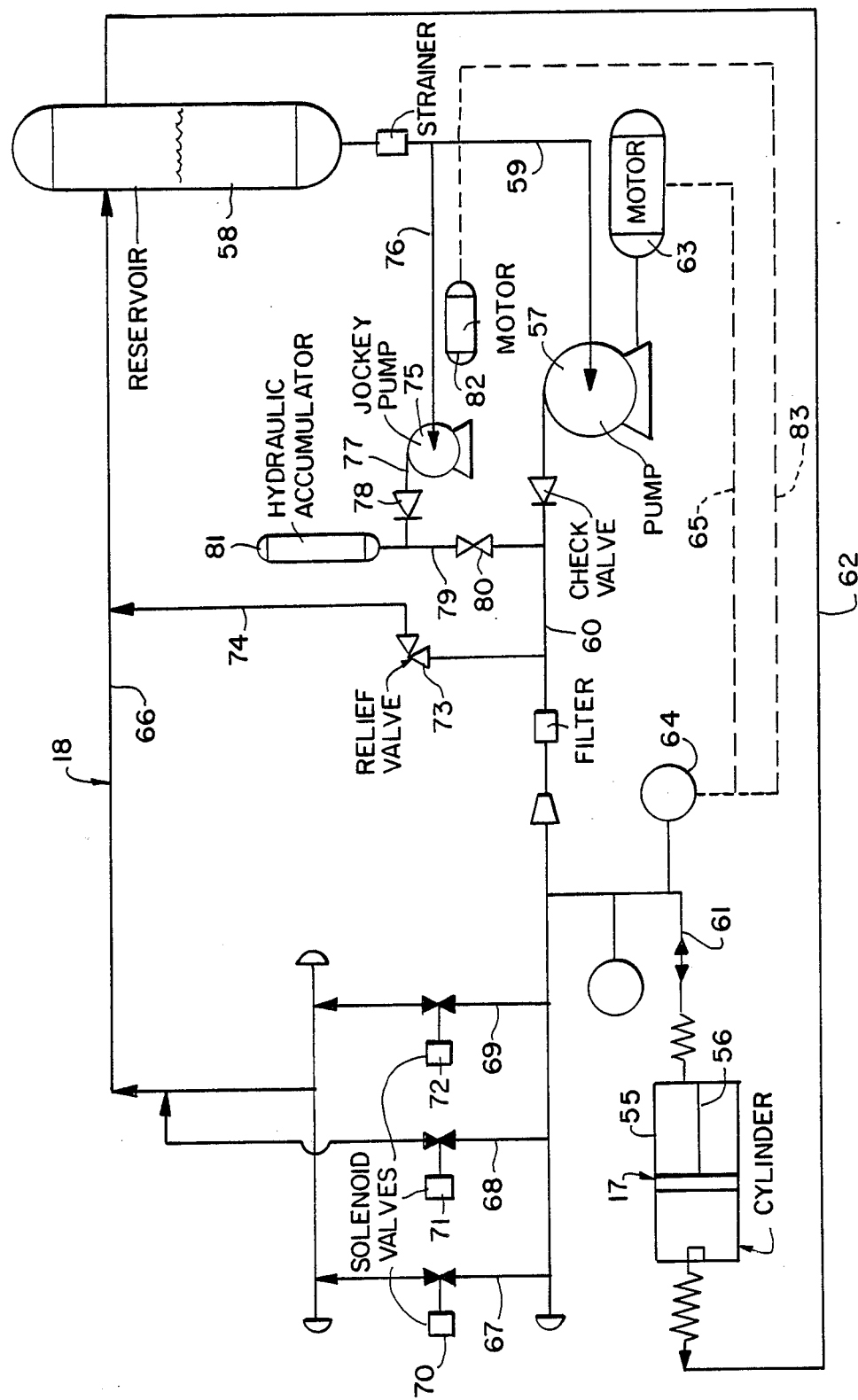
FIG. 6 is a diagrammatic-schematic view of the fluid supply system of the control system.

Referring to FIGS. 2 and 6, there is shown a perspective view of valve 14 operatively connected to a control system 15. The control system includes a spring assembly 16 operatively connected to valve 14 which functions to bias the valve in a closed position, a fluid cylinder assembly 17 operatively connected to valve 14 for urging the valve into an open position, as shown, against the biasing action of the spring assembly, and a fluid supply system 18 operatively connected to fluid cylinder assembly 17.

Isolation valve 14 includes a valve body 19 provided with a chamber 20 communicating through aligned passageways 21 and 22 with adjoining segments of main steam line 12. Mounted in chamber 20 is a ball valve 23 having a lower trunion 24 journalled in a lower roller bearing assembly 25, and an upper trunion 26 journalled in an upper roller bearing assembly 27 provided in a bonnet 28. The bonnet is received within and closes the upper, open end of chamber 20 and is maintained in place by a bonnet retainer 29. Disposed diametrically in ball valve 23 and perpendicularly with respect to the axis of trunions 24 and 26 is a fluid passageway 30. It will be appreciated that by pivoting the ball valve to a position as illustrated in FIG. 2 with passageway 30 being aligned and communicating with passageways 21 and 22, the valve will be in an open position allowing the flow of high pressure steam through the valve assembly, and by pivoting the ball valve 90° from the position shown in FIG. 2, the valve will be in a closed condition, precluding the flow of high pressure steam through the valve assembly.

Rigidly mounted on upper trunion 26 for pivoting valve ball 23 is a crank unit 31. The unit consists of a cylindrical shaft 32 rigidly mounted on the upper end of upper trunion 26 for pivotal movement therewith about the axis of trunions 24 and 26, a crank arm portion 33 disposed radially relative to the axis of trunions 24 and 26 and operatively connected to fluid cylinder assembly 17, and a pair of crank arm portions 34 and 35 which are spaced axially relative to each other, disposed substantially 180° relative to crank arm portion 33 and are operatively connected to spring assembly 15. It will be appreciated that with the crank unit disposed in the position as shown in solid lines in FIG. 2, the ball valve will be in the open position as shown and when the crank unit is pivoted 90° to the position as shown in phantom lines, the ball valve correspondingly will be pivoted 90° in the closed position.

Figure 4:
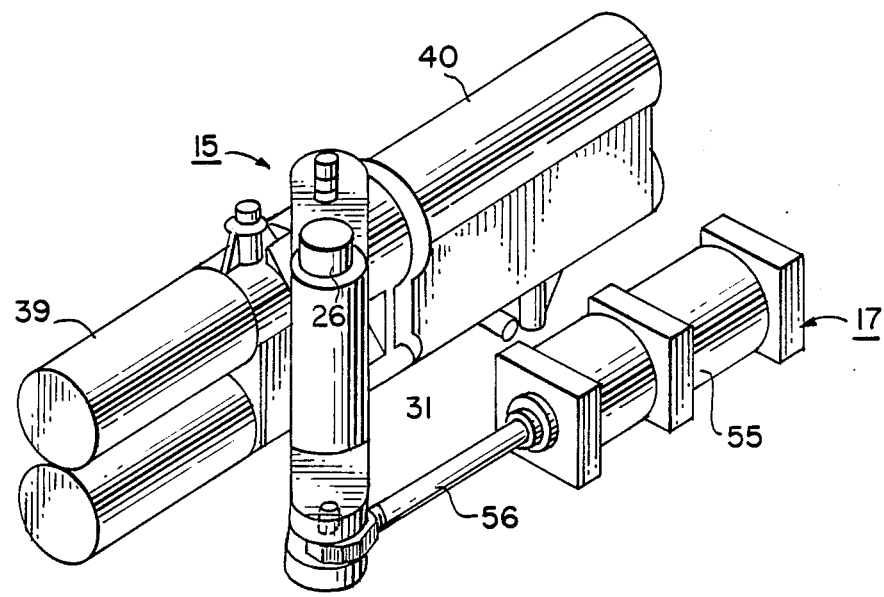
FIG. 4 is a perspective view of the spring assembly and actuator mechanism of the control system, illustrated in a manner in which the valve would be disposed in a closed condition.
Figure 5:
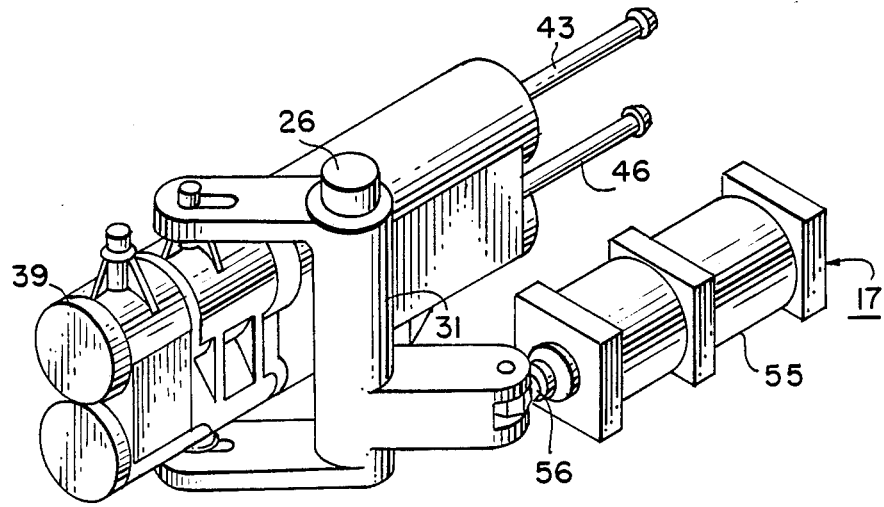
FIG. 5 is a perspective view similar to the view shown in FIG. 4, illustrating the positions of the components of the system when the valve is in the open condition.

Referring to FIGS. 3 through 5, spring assembly 15 is mounted in a support structure disposed above the level of the valve assembly. The support structure includes an upper plate member 36 provided with a longitudinally disposed, downwardly opening guide channel 37. Mounted on a bottom portion of the support structure is an upwardly opening guide channel 38 which is disposed in vertical alignment with upper guide channel 37.

Spring assembly 16 generally comprises a pair of spring canisters. More specifically, the assembly includes a stationary member 39 and a moveable member 40 which is displaceable longitudinally relative to stationary member 39. Stationary member 39 includes an upper cylindrical section 41 having an end wall 42 and an axially disposed guide rod 43, and a lower cylindrical section 44 having an end wall 45 and an axially disposed guide rod 46. Upper section 39 further is provided with an upwardly projecting pin 47 having a bushing 48 received within guide channel 37. Movable member 40 includes an upper cylindrical section 49 mounted on and axially displaceable relative to cylindrical section 41, and a lower cylindrical section 50 mounted on and axially displaceable relative to cylindrical section 44. Movable member 40 is supported on and movable along lower guide channel 38 by means of a set of rollers 51 which is adapted to ride on the upper edges of the lower guide channel. The movable member is guided along lower guide channel 38 by means of a pair of downwardly projecting pins 52 and 53 which are provided with bushings 52a and 53a received within the lower guide channel. In addition, the upper section of the movable member is provided with an upwardly projecting pin 54 having a bushing 54a received within upper guide channel 37. The axes of pins 47, 52, 53 and 54 and of guide rods 43 and 46 lie in the same vertical plane so that movable member 49 is capable of being freely displaced longitudinally along guide channels 37 and 38.

Guide rods 43 and 46 are rigidly secured at their inner ends to stationary member 39 and at their outer ends to the support structure of the spring assembly. Mounted on the cylindrical sections 49 and 50 of the movable member are a pair of end walls which are disposed in longitudinal alignment with stationary end walls 42 and 45. Interposed between such movable end walls and stationary end walls 42 and 45 are sets of nested coil springs which function to bias the canister sections apart in the conventional manner.

As best shown in FIGS. 2, 4 and 5 crank arm portions 34 and 35 are adapted to straddle movable member 40 of the spring assembly. They are provided with vertically aligned slots which are adapted to receive vertically aligned pins 52 and 54. It will be appreciated that upon longitudinal displacement of movable member 40 relative to stationary member 39 of the spring assembly, crank arm members 34 and 35 will be caused to pivot to correspondingly pivot ball valve 23 to open and close the valve assembly.

Fluid cylinder assembly 17 is of a conventional construction and also is mounted on the structure supporting the spring assembly. It includes a cylinder 55 and a rod 56 pivotally connected to crank arm portion 33 by means of a connecting pin 57. In the conventional manner, fluid under pressure may be supplied to the rod end of the cylinder to retract the rod and correspondingly pivot crank unit 31.

Under conditions when no fluid under pressure is supplied to the rod end of cylinder assembly 17, the biasing action of the springs in the spring assembly will function to extend movable canister member 40 relative to canister member 39 and correspondingly pivot crank member 31 to the position as shown in FIG. 4. Under such conditions, valve ball 23 will be pivoted 90° relative to the position shown in FIG. 2 so that the valve assembly will be in the closed position. When fluid under pressure is supplied to the rod end of cylinder assembly 17 to retract the rod of the assembly, as shown in FIG. 5, the crank member will pivot to the position as shown in FIG. 5, retracting canister section 40 relative to canister member 39 to compress the springs of the spring assembly. Correspondingly, ball valve 23 will be pivoted to the position as shown in FIG. 2, placing the valve assembly in the open position.

The operation of fluid cylinder 17 is controlled by fluid supply system 18 shown in FIG. 6. The system includes a primary pump 57 connected at its input end to a fluid reservoir 58 through a fluid supply line 59, and connected at its output end to the rod side of fluid cylinder 55 by means of fluid lines 60 and 61. The cylinder end of cylinder assembly 17 is connected to fluid reservoir 58 by a fluid return line 62. Primary pump 57 is operated by an electric motor 63, the operation of which is controlled by suitable electrical controls including a sensor 64 which senses the pressure in fluid line 61 an functions to transmit electrical signals to operate electric motor 63 through an electrical line 65. Disposed in parallel with fluid return line 62 is a secondary return line 66 which is connected through parallel branch lines 67, 68 and 69 to pressure line 60. The branch lines are provided with solenoid operated valves 70, 71 and 72 which normally are in the closed positions when electrically energized. Valves 70 and 71 are larger than valve 72 to provide higher flow rates than the flow rate of valve 72. As an example, valve 72 may be a ⅜ inch valve and each of valves 70 and 71 may be a 2 inch valve. The valves are independently operable to vary the flow rate of fluid returning to the reservoir through return line 66.

Initially, when solenoid valves 70, 71 and 72 are energized and thus caused to close, and motor 63 is energized to operate primary pump 57, fluid under pressure is supplied to the rod end of cylinder assembly 17 to retract rod 56. Under such circumstances, retracting rod 56 will pivot crank unit 31 in a counter-clockwise direction relative to FIGS. 4 and 5 to compress the springs in the spring assembly and position ball valve 23 in the open position as shown in FIG. 2. So long as solenoid valves 70, 71 and 72 remain closed and fluid line 60 is pressurized, rod 56 will be retained in the retracted position to maintain the springs of the spring assembly fully compressed. Whenever it is desired to close the valve at a slow rate, solenoid valve 72 is de-energized to allow fluid in pressure line 60 to be exhausted gradually through branch line 69 and return line 66 to the reservoir, and correspondingly exhaust fluid from the rod side of fluid cylinder 17. As fluid is exhausted gradually from the rod side of the fluid cylinder assembly, the force of the springs in the spring assembly will cause canister section 40 to extend relative to canister section 39. The displacement of canister member 40 will function to gradually pivot crank unit 31 in a clockwise direction to slowly pivot valve ball 23 and close the valve assembly. Under circumstances when it is desired to close the valve assembly more rapidly, all three solenoid valves 70, 71 and 72 are de-energized and thus open to allow fluid in the rod end of the fluid cylinder assembly to exhaust more rapidly.

The capacity of primary pump 57 is selected to provide sufficient pressure to counteract the biasing force of the springs in the spring assembly and to fully retract such springs and maintain them in their fully retracted or loaded positions in order to provide the loaded energy required to pivot the ball valve and close the valve assembly. In practice, helical coil springs are provided in the canisters of the spring assembly to provide a minimum valve closing force of 29,000 lbs. for each set of springs for a total closing force of 58,000 lbs. To counteract such spring force, a primary pump having a capacity of not less than 900 psi is selected. Excessive pressure in pressure line 60 is prevented by a relief valve 73 in a fluid line 74 interconnecting pressure line 60 and return line 66.

To effectively maintain the springs of the spring assembly in their fully retracted, loaded positions, it is necessary to maintin the fluid pressure in the rod end of fluid cylinder assembly 17 at not less than a predetermined pressure. To maintain such minimum pressure in fluid line 60 without having primary pump 57 cycle constantly, a secondary or jockey pump 75 is provided. The secondary pump is connected at its input end to fluid supply line 59 through a fluid line 76 and is connected at its output end to pressure line 60 through a fluid line 77 provided with a check valve 78 and fluid line 79 provided with a control valve 80. The output end of the secondary pump also is provided with an accumulator 81. The secondary pump is driven by a motor 82 which is operatively connected to pressure sensor 64 by means of an electrical line 83.

After primary pump 57 has been operated to pressurize line 60 and fully retract rod 56 against the biasing action of the spring assembly, secondary pump 75 will function to maintain pressure in fluid line 60 at a point above the minimum pressure required to maintain rod 56 in a fully contracted condition and at a point below the set point of relief valve 73. Under circumstances where the minimum pressure required to maintain rod 56 in its fully retracted position is 900 psi and the set point of relief valve 73 is 1500 psi, the electrical control system of motor 82 will be set to cause secondary pump 75 to cycle and thus maintain a pressure in fluid line 60 between approximately 1100 and 1300 psi, i.e., above the pressure required in fluid line 60 to maintain rod 56 fully retracted and below the set point of relief valve 73.

When the segment of the power generating plant shown in FIG. 1 has been de-activated, the actuating mechanism for valve assembly 14 will be in the closed position as shown in FIG. 4. When it is desired to open the valve assembly to allow steam under pressure to flow from the reactor vessel to the high pressure turbine, electrical controls are operated to energize motor 63 and operate primary pump 57. Pump 57 will then operate to supply fluid under pressure to fluid cylinder assembly 17 to retract piston 56. As the rod of the fluid cylinder assembly retracts, crank member 31 will be caused to pivot in a counter-clockwise direction to compress the springs in the spring assembly and assume a position as shown in FIG. 5. If the minimum pressure required to maintain rod 56 retracted is 900 psi and the set point of relief valve 73 is 1500, motor 82 controlled by pressure sensing device 64 will operate secondary pump 75 to maintain a pressure in fluid line 60 between 1100 and 1300 psi. If it is required to close the valve assembly at a slow rate under normal operating procedures for the purpose of testing, maintaining or repairing any components of the system, appropriate electrical controls are operated to de-energize solenoid valve 72 and pump motors 63 and 82. Fluid in pressure line 60 then will be allowed to exhaust slowly through return line 18 to relieve pressure in the rod end of the fluid cylinder assembly. As fluid pressure is relieved, the biasing action of the springs in the spring assembly will function to pivot crank unit 31 clockwise to a position as shown in FIG. 4 thus closing the valve. The closure time under such procedure would be in the order of about five minutes.

In the event of an emergency such as a loss of coolant in the reactant vessel or a break in the main steam line, when it is required to isolate steam generated by the reactor vessel by closing either or both valve assemblies 13 or 14, appropriate controls are operated to simultaneously de-energize and open valves 70, 71 and 72 and de-energize pump motors 63 and 82 to allow fluid in pressure line 60 to be exhausted at a rapid rate. Under such circumstances, pressure in the rod side of the fluid cylinder assembly will be relieved rapidly to allow the springs of the spring assembly to extend rapidly to close the valve assembly. With all three solenoid valves being open simultaneously, pressure line 60 will be relieved rapidly and result in a closure of the valve assembly in the order of three to five seconds. The rapid closure of the valve assembly thus will assure the prevention of a release of radioactivity into the environment.

From the foregoing detailed description, it will be evident that there are a number of changes, adaptions and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve pivotally into said open position against the action of said biasing means, means for supplying fluid under pressure to said fluid actuated means, said fluid supply means including a pump operatively connected to said fluid actuated means and at least one exhaust valve operatively connected to the pressure end of said pump, and means for deactivating said pump when said exhaust valve is in a open position relieving pressure from the pressure end of said pump.

2. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuating means for urging said valve pivotally into said open position against the action of said biasing means and means for supplying fluid under pressure to said fluid actuated means, said fluid supply means including a pump operatively connected to said fluid actuated means and a low flow rate exhaust valve and a high flow rate exhaust valve operatively connected to the pressure end of said pump.

3. A system according to claim 2 wherein said exhaust valves comprise solenoid operated valves.

4. A system according to claim 3 wherein said exhaust valves are operable to close when energized and open when deenergized.

5. A system according to claim 2 wherein said fluid supply means includes a reservoir operatively connected to said pump, and said exhaust valves are operatively connected to said reservoir.

6. A system according to claim 2 including means for deactivating said pump when either of said exhaust valves is in an open position for relieving pressure from the pressure end of said pump.

7. In a steam generating plant having a main steam line and a pivotally actuated valve moveable between open and closed positions for controlling the flow of steam in said main steam line, a system for operating said main steam line valve comprising means for biasing said valve pivotally into said closed position, fluid actuated means for urging said valve pivotally into said open position against the action of said biasing means, means for supplying fluid under pressure to said fluid actuated means, said fluid supply means including a pump operatively connected to said fluid actuated means and at least one exhaust valve operatively connected to the pressure end of said pump, and means responsive to a predetermined pressure in the pressure end of said pump for operating said pump.

8. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve pivotally into said open position against the action of said biasing means, means for supplying fluid under pressue to said fluid actuated means, said fluid supply means including a pump operatively connected to said fluid actuated means and at least one exhaust valve operatively connected to the pressure end of said pump, and means operatively connected to said pump and responsive to pressure in the pressure end of said pump for maintaining said pressure within a predetermined range.

9. A system according to claim 8 wherein the limits of said pressure range comprise a first pressure in excess of a predetermined amount of pressure sufficient to overcome the closure force of said biasing means and a second pressure less than a predetermined amount of pressure sufficient to activate a relief valve operatively connected to the pressure end of said pump.

10. A system according to claim 8 wherein said predetermined pressure range is 1100 to 1300 psi.

11. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve pivotally into said open position against the action of said biasing means, and means for supplying fluid under pressure to said fluid actuated means, said fluid supply means including a primary pump and a secondary pump having a capacity smaller than said primary pump operatively connected to said fluid actuated means and at least one exhaust valve operatively connected to the pressure ends to said pumps.

12. A system according to claim 11 wherein said secondary pump includes means responsive to a predetermined pressure in the pressure end of said primary pump operative to maintain said pressure within a predetermined range.

13. A system according to claim 12 wherein the limits of said pressure range comprise a first pressure in excess of a predetermined amount of pressure sufficient to overcome the closure force of said biasing means and a second pressure less than a predetermined amount of pressure sufficient to activate a relief valve operatively connected to the pressure end of said primary pump.

14. A system according to claim 12 wherein said predetermined pressure range is 1100 to 1300 psi.

15. A system according to claim 11 including an accumulator operatively connected to the pressure end of said secondary pump.

16. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve pivotally into said open position against the action of said biasing means, and means for supplying fluid under pressure to said fluid actuated means, said biasing means comprising a spring assembly, said fluid actuating means including a fluid cylinder assembly having a rod operatively connected to said valve and a cylinder end operatively connected to said fluid supply means, said fluid actuated means including first and second crank arm members connected to and pivotal about a pivot axis of said valve, said first crank arm member being operatively connected to the rod of said fluid cylinder assembly and said second crank arm member being operativley connected to said biasing means, and said fluid supply means including a pump operatively connected to said fluid actuated means and at least one exhaust valve operatively connected to the pressure end of said pump.

17. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve pivotally into said open position against the action of said biasing means, and means for supplying fluid under pressure to said fluid actuated means, said fluid actuated means including first and second crank arm members connected to and pivotal about a pivot axis of said valve, said first crank arm member being operatively connected to the rod of said fluid clyinder assembly, said second crank arm member being operatively connected to said biasing means, said biasing means comprising a canister spring assembly, said second crank arm member being operatively connected to a movable canister section thereof, and said fluid supply means including a pump operatively connected to said fluid actuated means and at least one exhaust valve operatively connected to the pressure end of said pump.

18. A system according to claim 17 including means for guiding said movable canister section along a predetermined line of travel.

19. In a steam generating plant having a main steam line and a pivotally actuated valve movable between open and closed positions for controlling the flow of steam in said main steam line, a system for operating said main steam line valve comprising a spring assembly for biasing said valve pivotally into said closed position, fluid actuated means for urging said valve pivotally into said open position against the biasing action of said spring assembly and means for supplying fluid under pressure to said fluid actuated means, said fluid supply means including a pump operatively connected to said fluid actuated means and at least one exhaust valve operatively connected to the pressure end of said pump.

20. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve operatively into said open position against the action of said biasing means, and means for supplying fluid under pressure to said fluid actuated means, said biasing means comprising a canister spring assembly having a movable canister section operatively connected to said fluid actuating means, and said fluid supply means including a pump operatively connected to said fluid actuated means and at least one exhaust valve operatively connected to the pressure end of said pump.

21. A system according to claim 20 including means for guiding said movable canister section along a predetermined line of travel.

22. In a steam generating plant having a main steam line and a pivotally actuated valve movable between open and closed positions for controlling the flow of steam in said main steam line, a system for operating said main steam line valve comprising means for biasing said valve pivotally into said closed position, fluid actuated means for urging said valve pivotally into said open position against the action of said biasing means and means for supplying fluid under pressure to said fluid actuated means, said fluid supply means including a pump having the pressure end thereof constantly communicating with said fluid actuated means and at least one exhaust valve connected to the pressure end of said pump, normally disposed in a closed position and selectively operable to open the valve.

* * * * *